(12) United States Patent
Zhou et al.

(10) Patent No.: US 9,573,115 B2
(45) Date of Patent: Feb. 21, 2017

(54) FLUE GAS SORBENTS, METHODS FOR THEIR MANUFACTURE, AND THEIR USE IN REMOVAL OF MERCURY FROM GASEOUS STREAMS

(71) Applicant: Albemarle Corporation, Baton Rouge, LA (US)

(72) Inventors: Qunhui Zhou, Baton Rouge, LA (US); Seyed Behrooz Ghorishi, Charlotte, NC (US); John C. Parks, Baton Rouge, LA (US); William S. Pickrell, Baton Rouge, LA (US); Christopher J. Nalepa, Zachary, LA (US)

(73) Assignee: Albemarle Corporation, Baton Rouge, LA (US)

( * ) Notice: Subject to any disclaimer, the term of this patent is extended or adjusted under 35 U.S.C. 154(b) by 19 days.

(21) Appl. No.: 14/770,671

(22) PCT Filed: Mar. 14, 2014

(86) PCT No.: PCT/US2014/028795
§ 371 (c)(1),
(2) Date: Aug. 26, 2015

(87) PCT Pub. No.: WO2014/144401
PCT Pub. Date: Sep. 18, 2014

(65) Prior Publication Data
US 2016/0001261 A1 Jan. 7, 2016

Related U.S. Application Data

(60) Provisional application No. 61/794,650, filed on Mar. 15, 2013.

(51) Int. Cl.
| | | |
|---|---|---|
| *B01D 53/02* | (2006.01) | |
| *B01J 20/22* | (2006.01) | |
| *B01J 20/20* | (2006.01) | |
| *B01J 20/32* | (2006.01) | |
| *B01D 53/64* | (2006.01) | |
| *B01J 20/02* | (2006.01) | |
| *B01D 53/50* | (2006.01) | |
| *B01J 20/30* | (2006.01) | |

(52) U.S. Cl.
CPC ............... *B01J 20/22* (2013.01); *B01D 53/02* (2013.01); *B01D 53/508* (2013.01); *B01D 53/64* (2013.01); *B01J 20/027* (2013.01); *B01J 20/20* (2013.01); *B01J 20/3085* (2013.01); *B01J 20/3204* (2013.01); *B01J 20/3246* (2013.01); *B01D 2251/108* (2013.01); *B01D 2253/102* (2013.01); *B01D 2253/25* (2013.01); *B01D 2257/60* (2013.01); *B01D 2257/602* (2013.01)

(58) Field of Classification Search
CPC ............... B01D 2251/108; B01D 2253/102; B01D 2253/25; B01D 2257/60; B01D 2257/602; B01D 53/02; B01D 53/508; B01D 53/64; B01J 20/027; B01J 20/20; B01J 20/22; B01J 20/3085; B01J 20/3204; B01J 20/3246
See application file for complete search history.

(56) References Cited

U.S. PATENT DOCUMENTS

| | | |
|---|---|---|
| 4,747,855 A | 5/1988 | Hirai et al. |
| 5,158,582 A | 10/1992 | Onitsuka et al. |
| 5,536,302 A | 7/1996 | Golden et al. |
| 5,859,304 A | 1/1999 | Barchas et al. |
| 6,297,414 B1 | 10/2001 | Barchas et al. |
| 6,468,329 B2 | 10/2002 | Cho et al. |
| 6,638,489 B2 | 10/2003 | Otsuka et al. |
| 6,797,038 B2 | 9/2004 | Choudary et al. |
| 6,953,494 B2 | 10/2005 | Nelson, Jr. |
| 7,018,434 B2 | 3/2006 | Waynick |
| 7,261,747 B2 | 8/2007 | Waynick |
| 7,264,640 B2 | 9/2007 | Waynick |
| 7,364,599 B2 | 4/2008 | Waynick |
| 7,766,997 B2 | 8/2010 | Lindau |
| 7,833,315 B2 | 11/2010 | Lissianski et al. |
| 7,854,789 B1 | 12/2010 | Vidergar |
| 7,887,618 B2 | 2/2011 | Nelson |
| 8,057,576 B1 | 11/2011 | Pollack |
| 8,069,797 B2 | 12/2011 | Srinivasachar et al. |
| 8,080,088 B1 | 12/2011 | Srinivasachar |

(Continued)

FOREIGN PATENT DOCUMENTS

| | | |
|---|---|---|
| EP | 0433677 A1 | 6/1991 |
| JP | 2010202461 A | 9/2010 |

(Continued)

OTHER PUBLICATIONS

Author Unknown; "Activated Carbon Adsorption Ratings"; http://www.sentryair.com/activated-carbon-filter.htm; website originally visited Mar. 4, 2013; printed on Sep. 22, 2015; 2 pages.

*Primary Examiner* — Christopher P Jones
(74) *Attorney, Agent, or Firm* — Marcy M. Hoefling

(57) ABSTRACT

Disclosed are sorbents having superior water leachability performance characteristics especially when used as sorbents in semi-dry (CDS), high moisture (SDA), and fully wet $SO_2$ scrubbers. Also disclosed are methods for the production of such performance-enhanced sorbents, and methods for the use of such sorbents in the removal of mercury and possibly one or more other heavy metals or other contaminants from various gaseous streams. The sorbents are carbonaceous substrates treated with a bromine-containing compound, especially gaseous bromine, and with at least one organic compound that contains at least one olefinic double bond.

22 Claims, 4 Drawing Sheets

(56) References Cited

U.S. PATENT DOCUMENTS

| | | |
|---|---|---|
| 8,168,147 B2 | 5/2012 | Olson et al. |
| 8,198,208 B2 | 6/2012 | Gupta et al. |
| 8,216,535 B2 | 7/2012 | Pollack et al. |
| 8,277,542 B2 | 10/2012 | Srinivasachar et al. |
| 8,313,543 B2 | 11/2012 | Nalepa |
| 8,328,909 B2 | 12/2012 | Chao et al. |
| 8,354,019 B2 | 1/2013 | Laredo Sanchez et al. |
| 9,044,710 B2 | 6/2015 | Arndt et al. |
| 2007/0234902 A1 | 10/2007 | Fair et al. |
| 2007/0265161 A1 | 11/2007 | Gadkaree et al. |
| 2009/0211444 A1 | 8/2009 | Lissianski et al. |
| 2012/0067220 A1 | 3/2012 | Velpari et al. |
| 2012/0308454 A1 | 12/2012 | Heuter et al. |

FOREIGN PATENT DOCUMENTS

| | | |
|---|---|---|
| WO | 03093518 A1 | 11/2003 |
| WO | 2011139787 A1 | 11/2011 |
| WO | 2012030559 A1 | 3/2012 |
| WO | 2012082539 A1 | 6/2012 |
| WO | 2014116348 A1 | 7/2014 |

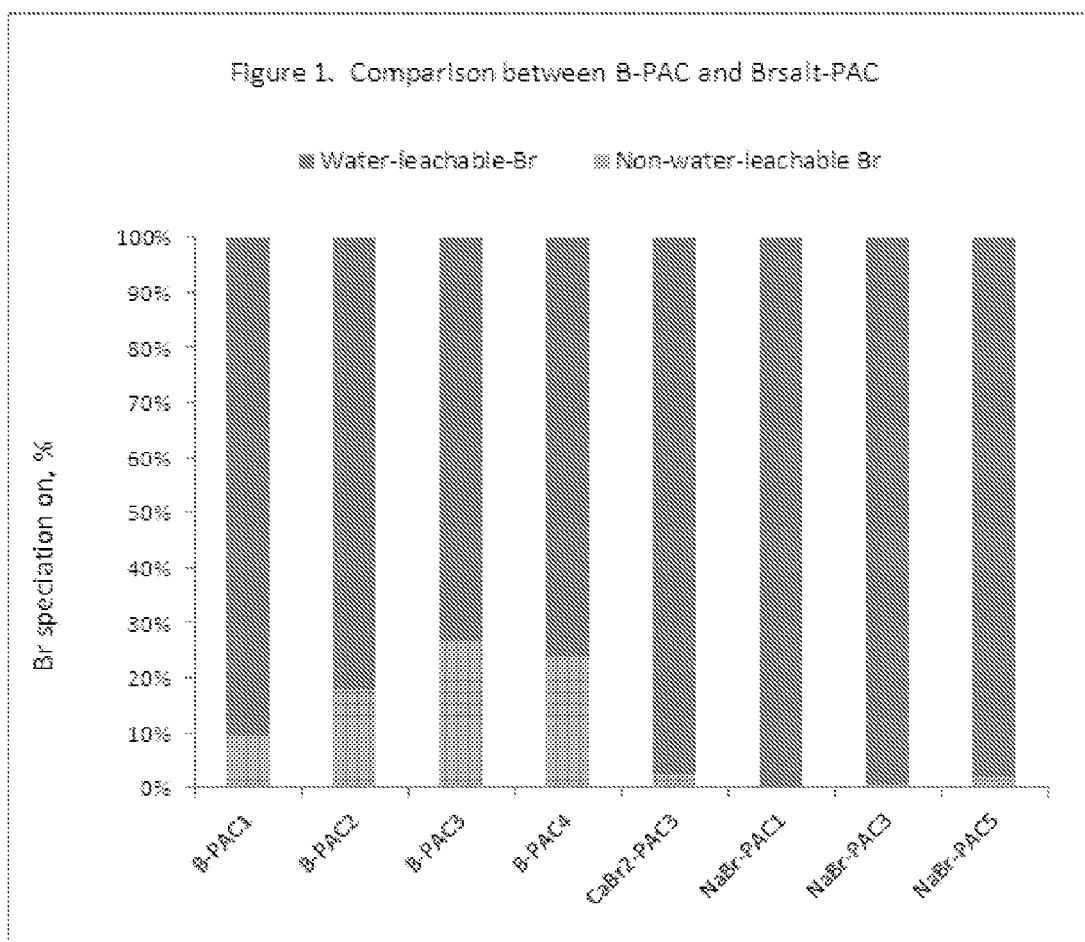

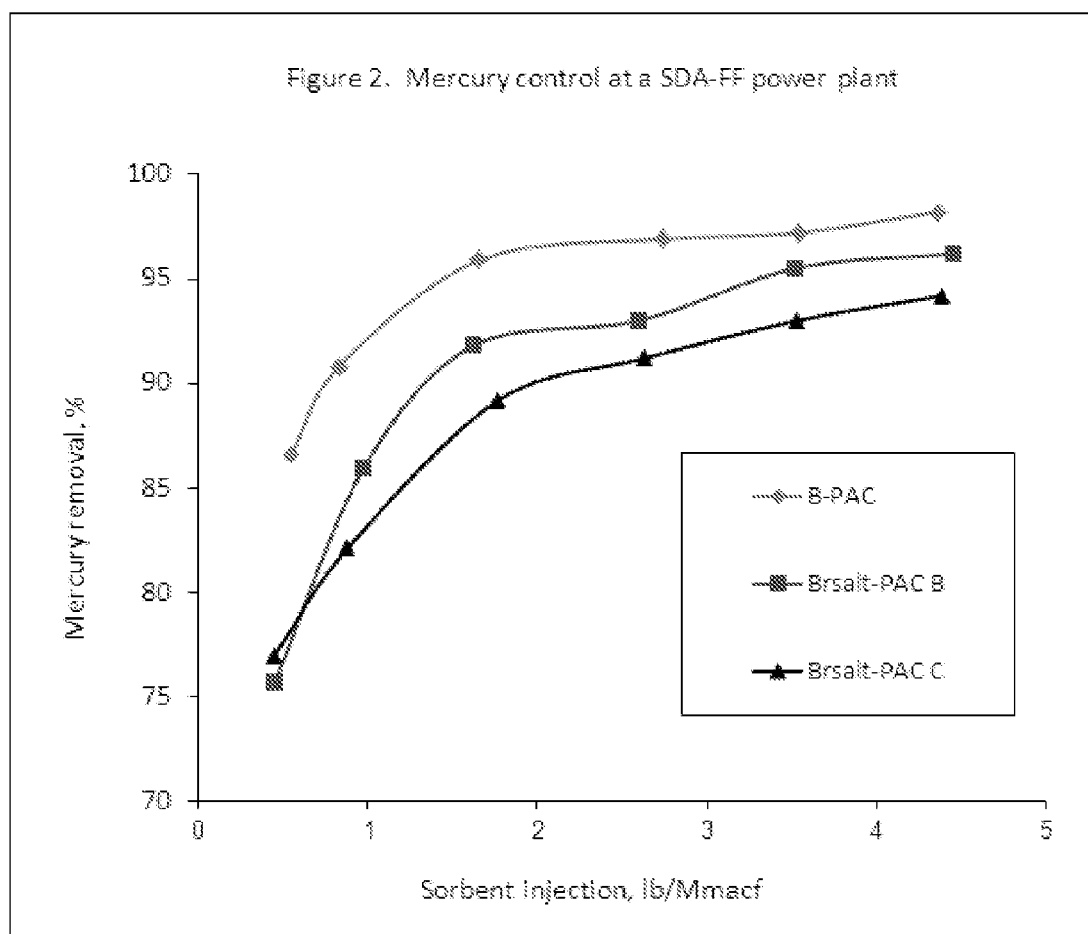

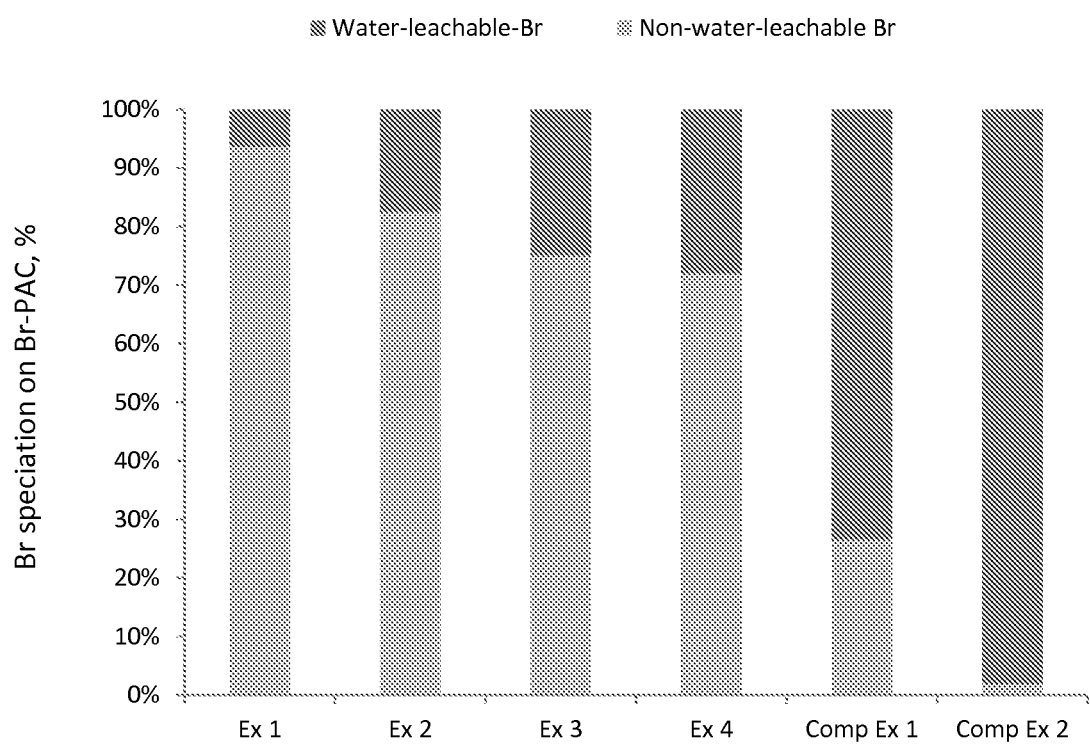
Fig 3. Br speciation of CH treated and commercial brominated PACs

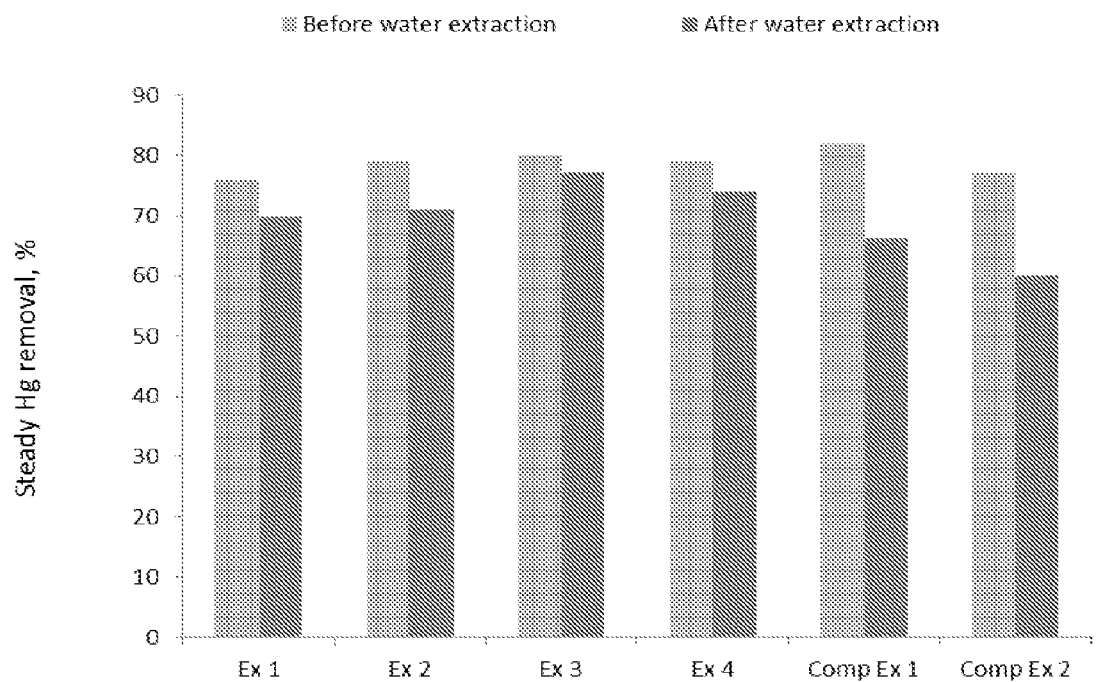
Fig 4. Mercury removal of CH treated and commercial brominated PACs

US 9,573,115 B2

FLUE GAS SORBENTS, METHODS FOR THEIR MANUFACTURE, AND THEIR USE IN REMOVAL OF MERCURY FROM GASEOUS STREAMS

REFERENCE TO RELATED APPLICATIONS

This application is the National Stage of International Patent Appl. No. PCT/US2014/028795 filed on Mar. 14, 2014, which in turn claims the benefit of U.S. Provisional Patent Appln. No. 61/794,650, filed on Mar. 15, 2013, the disclosures of which are incorporated herein by reference.

TECHNICAL FIELD

This invention relates to sorbents having superior performance characteristics especially when used as mercury sorbents in semi-dry (CDS), high moisture (SDA), and fully wet $SO_2$ scrubbers, as well as to methods for the production of such performance-enhanced sorbents, and to the use of such novel sorbents in the removal of mercury and possibly one or more other heavy metals from gaseous streams and aqueous solutions or streams.

BACKGROUND

Gas-phase brominated powdered activated carbons (e.g., B-PAC, produced by Albemarle Corporation) are effective sorbents for mercury emission control in gaseous streams containing mercury. Among various references to the synthesis and usage of brominated powdered activated carbon sorbents for mercury is U.S. Pat. No. 6,953,494 to Nelson, Jr.

About 70% to about 100% of the bromine in commercially-available brominated carbonaceous sorbents is water leachable (WL). This leachable bromine negatively influences the performance of the brominated carbonaceous sorbents in semi-wet $SO_2$ scrubbers such as Circulation Absorber Scrubbers (CDS), high moisture scrubbers such as Spray Dryer Absorbers (SDA), and in fully-wet $SO_2$ scrubbers because the sorbent is recycled to the system. Also, the dissolved bromine species could have negative impacts on the discharged wastewaters from these $SO_2$ scrubbers.

It would be of considerable advantage if a way could be found for effectively increasing the amount of non-water-leachable (NWL) components and/or species of brominated carbonaceous sorbents that remain present in the sorbent after exposure to water or aqueous suspensions or solutions, i.e., a way of reducing the amount of bromine-containing components and/or species originally present in the sorbent that are removed from the sorbent by or after exposure to water or aqueous systems during handling and/or usage. If this objective could be accomplished, this would enhance the utility of such sorbents in semi-dry CDSes, high moisture SDAs, and in fully wet $SO_2$ scrubbers. Additionally, such sorbents would be usable in plants that are equipped with a wet electrostatic precipitator (WESP) as a particulate control device.

This invention is believed to have successfully accomplished the foregoing objectives in an effective and economically efficient manner.

BRIEF NON-LIMITING SUMMARY OF THE INVENTION

This invention provides in one of its embodiments a method for increasing the fraction of non-water-leachable (NWL) bromine species on the surface of a brominated carbonaceous sorbent. Pursuant to this embodiment, a carbonaceous substrate is treated (contacted) prior to, during, and/or following bromination (preferably gas-phase bromination) with an organic compound that contains at least one olefinic double bond in the molecule, in an amount that is sufficient to increase the resistance of the sorbent to water leaching of bromine species. When conducting the bromination of the carbonaceous substrate, the contact time between these materials should be long enough to achieve the desired level of bromination. This in turn assists in preventing loss of effectiveness of the sorbent due to water leaching of the bromine content of the sorbent.

In the above method of operation, the olefinic treating agent is taken up by and becomes firmly associated or bonded somehow with the carbonaceous sorbent, whether the sorbent itself is brominated before, during, and/or after the treatment with the olefinic treating agent. Surprisingly, such treatments before, during, and/or after bromination increase the amount of water-tolerant (resistant to extraction by water) bromine species on the surfaces of the brominated carbonaceous sorbent. The actual mechanism by which this advantageous result is achieved is presently unknown. What is known is that anionic bromide ($Br^-$) and physically-adsorbed $Br_2$ species are water leachable, whereas other forms which may involve covalency, chemisorption, and/or other mechanisms are not leachable by water and that the treatment with the olefinic treating agent pursuant to this invention results in greater resistance of the brominated carbonaceous sorbent to loss of bromine and/or bromine-containing components and/or species due to water leaching.

As will be shown in greater detail hereinafter, this invention has enabled the formation of brominated carbonaceous sorbents in which the amount of water leachable bromine species decreased from 70% to less than 10%. Moreover, the mercury capture performance of such treated NWL brominated powdered activated carbon sorbents is similar to that of brominated powdered activated carbon sorbent which has not been subjected to such treatment (i.e., commercial B-PAC). Thus the treatment with the olefinic treating agent itself in experimental work conducted to date has had no significant adverse effect on the mercury sequestration effectiveness resulting from the bromination. As used herein including the claims, each of the terms "sequestration, sequestering, and sequestered" and also the term "capture" means or refers to removal.

Thus in another embodiment of this invention, there is provided a brominated carbonaceous sorbent composition having increased resistance to water leaching when exposed to water, water solutions, and/or water suspensions during handling or use, wherein said sorbent is contacted prior to, during, and/or after bromination (preferably gas-phase bromination) with an olefinic treating agent. Such contacting is conducted using an amount of olefinic treating agent sufficient to increase the resistance of the brominated sorbent to water leaching of bromine species. Bromination is preferably gas-phase bromination.

Still another embodiment of this invention is a method for removing mercury and/or mercury-containing compounds and/or species from a mercury-containing gaseous stream, and/or for removing one or more other heavy metals or other contaminants from a gaseous stream, the method comprising the steps of:
proving a brominated carbonaceous sorbent that is
prepared by treating a carbonaceous substrate with an
effective amount of a bromine-containing compound in
gas or liquid form to increase the ability of the carbonaceous substrate to adsorb mercury and/or mercury-containing compounds and/or species, and prior to, during, and/or after the treating with the bromine-containing compound (bromination treatment), treating the carbonaceous substrate with at least one olefinic treating agent in an amount sufficient to increase the resistance of the sorbent to water leaching of bromine and/or bromine-containing components and/or species by water;

injecting the sorbent that has been treated with a bromine-containing compound in gas or liquid form and at least one olefinic treating agent, into a gaseous stream containing mercury and/or one or more other heavy metals or other contaminants, whereby an amount of said sorbent is widely dispersed in at least a portion of said gaseous stream in an amount sufficient to adsorb mercury and/or mercury-containing compounds and/or species, and/or one or more other heavy metals or other contaminants, from the so treated gaseous stream; and collecting and removing the sorbent from the so treated gaseous stream.

Yet another embodiment of this invention is a method for manufacturing a brominated carbonaceous sorbent having increased resistance to water leaching of bromine species, which method comprises contacting a carbonaceous substrate with a bromine-containing compound in gas or liquid form for a sufficient time to increase the ability of the carbonaceous substrate to adsorb mercury and/or mercury-containing compounds and/or species, and contacting said carbonaceous substrate with an olefinic treating agent in an amount sufficient to increase the resistance of the brominated sorbent to loss of bromine species due to water leaching.

Another embodiment of this invention is a method for producing a brominated sorbent having increased resistance to water leaching of bromine species. The method comprises contacting a brominated carbonaceous sorbent with at least one olefinic treating agent.

In all situations wherein a bromine-containing compound or an olefinic treating agent of this invention is being fed into contact with a carbonaceous substrate to form a brominated carbonaceous sorbent of this invention, the total amount of bromine-containing compound and/or of olefinic treating agent fed should be sufficient to achieve a suitable target quantity that provides the functions for which they are being used. That is, the targeted total amount of bromine-containing compound to be fed should be at least sufficient to improve the mercury removal effectiveness of the resultant brominated and olefin treated carbonaceous substrate. Similarly, the total amount of the olefinic treating agent to be fed should be at least sufficient to improve the resistance of the brominated and olefin treated carbonaceous substrate to water leaching of bromine species. Accordingly, the rate of the respective feeds of bromine-containing compound and of the olefinic treating agent should be controlled so that the respective times of feeding are of sufficient duration to provide suitable targeted amounts of the respective substances within a suitable period of time. Thus the higher the rate of a feed, the shorter the time of the feed, and conversely, the lower the rate of a feed, the longer the time of the feed.

The above and other embodiments and features of this invention will become still further apparent from the ensuing description, appended claims, and figures of the drawings.

BRIEF DESCRIPTION OF THE DRAWINGS

FIG. 1 is a bar chart illustrating the extent of water leachable bromine, if any, in experiments in which four different brominated powdered activated carbon compositions (produced by Albemarle Corporation via gas-phase bromination) and four different bromide salt impregnated powdered activated carbon compositions one of which is a commercially available product from another producer, and three of which were prepared in the laboratory by the salt impregnation method. These results illustrate the state of the art prior to this invention.

FIG. 2 is a graph illustrating the results of full scale mercury control tests comparing the mercury control characteristics of several types of brominated powdered activated carbon compositions in an SDA equipped with a fabric filter for capturing particulates. In these tests, one brominated powdered activated carbon composition, B-PAC (produced by Albemarle Corporation via gas-phase bromination), and two different bromide-salt-impregnated powdered activated carbon compositions, Brsalt PAC B and Brsalt PAC C, both of which are commercially available, were evaluated. The better mercury reduction results obtained with B-PAC are attributed to the retention of some bromine in the B-PAC sorbent through its recycle and re-use. These results also illustrate the state of the art prior to this invention.

FIG. 3 is a bar chart illustrating the water-leachable bromine species and non-water-leachable bromine species in six different brominated powdered activated carbon compositions. In this bar chart, Examples, 1, 2, 3, and 4 are compositions of this invention which included treatments of a commercial PAC with both gaseous bromine and a olefinic treating agent (cyclohexene), and Comparative Examples 1 and 2, which are compositions not of this invention, because while brominated with gaseous bromine, and salt phase bromide (NaBr), they were not treated with an olefinic treating agent. The data for FIG. 3 also appear in Table 1.

FIG. 4 is a bar chart comparing the extent of mercury adsorption of Examples 1, 2, 3, and 4 before and after water extraction. FIG. 4 also shows the extent of mercury absorption of Comparative Examples 1 and 2 after water extraction declined. The mercury removal of the sorbent in Comparative Example 2 decreased to about the level of plain PAC since almost no bromine remained on the surface. Comparative Example 1 had higher mercury adsorption than plain PAC, presumably because it retained approximately 30% of its bromine after water extraction. Again in this bar chart, Examples, 1, 2, 3, and 4 illustrate the results achieved pursuant to this invention. Comparative Examples 1 and 2 are the results achieved using brominated powdered activated carbon compositions not of this invention. The difference between FIGS. 3 and 4 is that FIG. 4 shows mercury adsorption results obtained from samples before water extraction and after water extraction (after-water-extraction samples are the same samples as in FIG. 3).

FURTHER DETAILED DESCRIPTION OF THE INVENTION

For convenience the term "organic compound that contains one or more olefinic double bonds in the molecule" is often referred to hereinafter as the "olefinic treating agent", whether or not this term is further modified with "of this invention". Further, the term "olefinic treating agent" whether or not so modified refers to a case where only a single organic compound that contains one or more olefinic double bonds in the molecule is being referred to and also to a case where a mixture (plurality) of organic compounds that contain one or more olefinic double bonds in the molecule is being referred to.

The terms "brominated sorbent" and "brominated sorbents" as used throughout this document refer to the brominated carbonaceous sorbents of this invention, unless otherwise noted.

Carbonaceous Substrate Compositions

The carbonaceous substrate is a carbon-based adsorbent. This invention is deemed applicable to most, if not all, carbon-based adsorbent compositions produced from different feedstocks, although some differences in effectiveness are to be expected. Thus in a given situation where the effectiveness of a given carbonaceous substrate has not already been established, the suitability of such a substrate can be determined by the simple expediency of performing a few laboratory experiments of water extractability of such compositions using techniques as those referred to hereinafter or elsewhere in the prior art.

Suitable carbonaceous substrates include activated carbon, activated charcoal, activated coke, carbon black, char, unburned or partially-burned carbon from a combustion process, and the like. Mixtures of carbonaceous substrates can be employed. A preferred carbonaceous substrate is activated carbon, more preferably powdered activated carbon (PAC). It is sometimes preferred that the powdered activated carbon is produced from coconut shells, wood, brown coal, lignite, anthracite, subbituminous coal, and/or bituminous coal. Still other sources for the PAC may prove useful.

Illustrative of suitable powdered activated carbon substrates are the following:

PAC Type 1 (PAC1)—PACs which are produced from various types of wood.
PAC Type 2 (PAC2)—PACs which are produced from bituminous coal.
PAC Type 3 (PAC3)—PACs which are produced from various types of coconut shells.
PAC Type 4 (PAC4)—PACs produced from various anthracite coals.
PAC Type 5 (PACS)—PACs which are produced from lignite, a soft brown fuel with characteristics that place it somewhere between coal and peat.

The above types of PAC were employed in the runs reported in the Figures and/or in the Examples.

As noted above, PACs can be enhanced pursuant to this invention by use of the combination of (i) bromination with bromine, and especially by gas-phase bromination, and (ii) treatment with an olefinic treating agent with the bromination occurring before, during, and/or after the treatment with the olefinic treating agent. As also noted above, the degree of enhancement from carbonaceous substrate to carbonaceous substrate will probably differ because of differences in the make-up, properties, and characteristics of the different carbonaceous substrates.

The Olefinic Treating Agents of this Invention

It has been reported heretofore that activated carbon can adsorb organic materials such as olefins. However, so far as is known, no one has presented any information that would lead one to expect or even foresee the possibility of an enhancing the resistance to water extractability by treatment of a brominated PAC with an olefinic treating agent wherein the bromination is conducted before during, and/or after the treatment with the olefinic treating agent pursuant to this invention.

The olefinic treating agent is at least one organic compound containing at least one olefinic double bond. Generally speaking, there are five basic types of olefinic treating agents that are recommended for use in the practice of this invention. These are as follows:

Type 1) An organic aliphatic or cycloaliphatic compound that contains an aliphatic or cycloaliphatic moiety containing a single olefinic double bond, which moiety is represented by the formula

—CH=CH— or a mixture of two or more such compounds.

Type 2) An organic aliphatic or cycloaliphatic compound that contains an aliphatic or cycloaliphatic moiety containing a single olefinic double bond represented by the formula

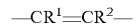

—CR$^1$=CR$^2$— where R$^1$ is a C$_{1-3}$ alkyl group and R$^2$ is independently a C$_{1-3}$ alkyl group or a hydrogen atom; or a mixture of two or more such compounds.

Type 3) A non-cyclic aliphatic organic compound that contains a conjugated or non-conjugated pair of double bonds and that is represented by the formula

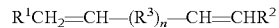

R$^1$CH$_2$—CH—(R$^3$)$_n$—CH=CHR$^2$ where R$^1$ is a hydrogen atom or an alkyl group having in the range of 1 to about 4 carbon atoms, R$^2$ is independently a hydrogen atom or an alkyl group having in the range of 2 to about 4 carbon atoms, and R$^3$ is an alkylene group containing in the range of 1 to about 4 carbon atoms, and n is either 0 or 1; or a mixture of two or more such compounds.

Type 4) A cycloaliphatic organic compound that contains a conjugated pair of double bonds in an otherwise saturated aliphatic 5-membered ring or a conjugated or non-conjugated pair of double bonds in an otherwise saturated aliphatic 6 to 10-membered ring system.

Type 5) An organic compound that contains one or two vinyl substituents directly bonded to an aromatic ring system which preferably is a substituted or unsubstituted benzene ring.

Non-limiting illustrative examples of the above Type 1) organic compounds include such linear aliphatic monounsaturated compounds as 1-pentene; 2-pentene; a mixture of 1-pentene and 2-pentene; 1-hexene; 2-hexene; 3-hexene; a mixture any two of or all three of 1-hexene, 2-hexene, and 3-hexene; 1-heptene; 2-heptene; 3-heptene; a mixture any two of or all three of 1-heptene, 2-heptene, and 3-heptene; one or more liquid octene isomers such as 1-octene; one or more liquid nonene isomers such as 1-nonene; one or more liquid decene isomers such as 1-decene; and mixtures of any two or more of the foregoing linear aliphatic compounds such as a mixture of pentene and hexene isomers, a mixture of hexene and octene isomers, and so on. Non-limiting illustrative examples of the above Type 1) organic compounds further include such remotely branched open chain aliphatic compounds non-limiting examples of which include 3-3-dimethyl-1-pentene; 3-methyl-1-pentene; 4-methyl-1-pentene; 4-methyl-1-hexene; 5-methyl-1-hexene; 5-methyl-2-hexene; and mixtures of two or more of the foregoing remotely branched open chain monounsaturated aliphatic compounds. Another group of monounsaturated compounds are the cyclic monoolefins, non-limiting examples of which include cyclopentene; cyclohexene; cycloheptene; and mixtures of any two or all three of cyclopentene, cyclohexene, and cycloheptene. Additionally, mixtures composed of one or more open chain monoolefins with one or more cyclic monoolefins satisfying the formula of above Type 1) organic compounds may be used, if desired.

Type 2) compounds are similar to Type 1) compounds except that one of the carbon atoms of the double bond is substituted by a $C_{1-3}$ alkyl group. A few non-limiting illustrative examples of such Type 2) compounds include 2-methyl-1-pentene; 2-ethyl-1-pentene; 2,3-dimethyl-1-pentene; 2,4-dimethyl-1-pentene; 2-methyl-2-pentene; 2,3-dimethyl-2-pentene; 3,4-dimethyl-2-pentene.

Non-limiting illustrative examples of the above Type 3) diene-containing organic compounds include 1,3-pentadiene (a representative conjugated liquid diene) and 1,4-pentadiene (a representative non-conjugated liquid diene).

Non-limiting illustrative examples of the above Type 4) diene-containing cycloaliphatic organic compounds that contain a conjugated pair of double bonds in an otherwise saturated aliphatic 5-membered ring or a conjugated or non-conjugated pair of double bonds in an otherwise saturated aliphatic 6 to 10-membered ring system include 1,3-cyclopentadiene, cyclopentadiene dimer, 1,3-cyclohexadiene, and 1,4-cyclohexadiene.

Non-limiting illustrative examples of the above Type 5) organic compounds include styrene, at least one $C_{1-4}$-monoalkyl-ring-substituted styrene, divinylbenzene, or a mixture of divinylbenzene and ethylvinylbenzene isomers.

One such mixture which is available from Sigma-Aldrich is comprised of 55% of a mixture of divinylbenzene isomers (CAS® No. 1321-74-0) with the remainder being mainly 3- and 4-ethylvinylbenzene. One or more compounds of Type 1) through Type 5) may contain functional substituents which do not interfere with their performance pursuant to this invention. Ether functionality (—O—) serves as a typical example. Taking into consideration costs and availability, hydrocarbon compounds of Type 1) through Type 5) are usually preferred.

The olefinic treating agent can be used in liquid form or gaseous form; liquid form is preferred. Amounts of the olefinic treating agent relative to the total weight of the brominated carbonaceous sorbent are typically in the range of about 0.5 wt % to about 20 wt %, more preferably in the range of about 1 wt % to about 15 wt %, still more preferably in the range of about 1.5 wt % to about 10 wt %, and even more preferably about 2.5 wt % to about 7.5 wt % relative to the total weight of the brominated carbonaceous sorbent. Usually, all of the olefinic treating agent is incorporated into the brominated carbonaceous sorbent.

Also, by "liquid" and "gaseous" is meant that the compound is in the liquid state and/or the gaseous state at the temperature to which the compound is being exposed under actual service conditions. Thus the compound may be a solid at room temperature, provided that it is in the liquid state and/or gaseous state under temperatures encountered during the actual service or use conditions. One factor that may affect the reaction conditions selected is the flash point of the olefinic treating agent.

Bromine Sources

The bromine-containing compound is elemental bromine ($Br_2$) and/or hydrogen bromide (HBr), which are usually used in gaseous form or liquid form. Elemental bromine and/or hydrogen bromide are normally and preferably used in gaseous form. Elemental bromine is a preferred bromine-containing compound. Typically elemental bromine, especially when used in gaseous form, is the preferred source of bromine for use in practicing the various embodiments of this invention. As noted in U.S. Pat. No. 6,953,494, gaseous hydrogen bromide may be used. Similarly, mixtures of gaseous bromine and gaseous hydrogen bromide may be used.

Bromination Reaction Conditions

Treatment of the carbonaceous substrate is preferably conducted such that the sorbent has a content in the range of about 0.1 to about 20 wt. % bromine, based on the weight of the brominated carbonaceous sorbent after contact with the bromine-containing compound (bromination). Preferably the brominated sorbent has about 0.5 wt % to about 15 wt % bromine, more preferably about 2 wt % to about 12 wt % bromine based on the weight of the brominated sorbent. Amounts of bromine greater than 20 wt % can be incorporated into the carbonaceous substrate if desired. However, as the amount of bromine in the sorbent increases, there is a greater possibility that some of the bromine may evolve from the sorbent under some circumstances. All of the bromine from the bromine-containing compound is usually incorporated into the brominated sorbent. Preferred brominated carbonaceous sorbents are brominated powdered activated carbons, especially those having about 2 wt % to about 12 wt % bromine; such sorbents are available commercially from Albemarle Corporation as B-PAC, C-PAC, and H-PAC.

The bromination is typically a gas-phase bromination conducted at elevated temperatures by both batch and in-flight methods. To utilize elemental bromine in its gaseous form, the bromine should be heated and maintained above about 60° C. Temperatures in the range of about 60° C. up to about 140° C. are typical for use in the gas-phase bromination of the powdered activated carbon sorbent for mercury with gaseous elemental bromine. Treatment with gaseous bromine is advantageous because, in the gaseous state, the bromine more uniformly contacts the powdered activated carbon sorbent and in use in mercury-containing gaseous streams interacts readily with the mercury impurities normally present therein. A preferred method of converting the liquid bromine to a bromine-containing gas is to use a heated lance. Liquid bromine can be metered into such a heated-lance system at one end and be distributed as a gas to the substrate materials at the other end. See in this connection U.S. Pat. No. 6,953,494, for a further detailed description of gas-phase bromination.

Modes of Feeding to Form NWL Sorbent

As noted above, this invention involves separate feeding of a bromine-containing compound in liquid or gaseous form, and of an olefinic treating agent of this invention. The minimum number of separate feeds, therefore, is two, one feed therefore providing a sufficient amount of the bromine-containing compound, and the other feed providing a sufficient amount of the olefinic treating agent of this invention. However, the desired total quantities of the bromine-containing compound and of the olefinic treating agent of this invention can be achieved through multiple feeds of either or both of these materials. Thus this invention is not limited to any particular number of the respective feeds provided that the respective feeds provide in the finished product or resultant product quantities of the materials fed that are sufficient to provide the advantages of this invention, namely improved mercury removal effectiveness of the sorbent for mercury because of the bromination and increased resistance to water leaching of bromine species because of the treatment with an olefinic treating agent of this invention.

Bromination of the carbonaceous substrate can be carried out before, during, and/or after the treatment with the olefinic treating agent. Preferably, bromination is conducted before or after the treatment with an olefinic treating agent; more preferably, bromination is conducted after the treatment with an olefinic treating agent.

In order to still further appreciate the practice and advantages of this invention, the following Examples involving the treatment of a powdered activated carbon (PAC) with an olefinic treating agent before and/or after gas-phase bromination are presented. These Examples are not intended to limit the invention to only the subject matter disclosed therein.

EXAMPLES 1-4

PAC3 sorbent and B-PAC3 sorbent, two commercially available products produced by Albemarle Corporation were used in these experiments. PAC3 sorbent is comprised of unbrominated powdered activated carbon and B-PAC3 sorbent is comprised of a brominated powdered activated carbon produced via gas-phase bromination with bromine by Albemarle Corporation. Samples of both products were separately pre-dried in an oven at 130° C. for 2 hours.

An olefinic treating agent of this invention, cyclohexene, was transferred to two 3 mL vials, each of which was then placed individually in the bottom center of a glass bottle that contained a sample of pre-dried PAC3 sorbent or B-PAC3 sorbent. The sample bottles were then capped tightly and placed in an oven maintained at 80° C. The sample bottles were agitated after all the liquid cyclohexene had vaporized and then the samples were allowed to cool down to room temperature. Examples 1 and 2 consisted of PAC3 treated with cyclohexene and then brominated with gas-phase bromine. Examples 3 and 4 consisted of samples of PAC3 sorbent which had previously been subjected to gas-phase bromination with bromine and which were then individually treated in a bottle with a targeted quantity of cyclohexene. The gas-phase bromination followed the procedure disclosed in U.S. Pat. No. 6,953,494. The individual treatment temperatures with the cyclohexene as the olefinic treating agent. The targeted values of cyclohexene for these four samples was 3 or 6 wt. % of cyclohexene on the finished sorbent. The total actual bromine content of Examples 1, 2, 3, and 4 was 5.32, 5.85, 6.62, and 6.86 wt. % of sorbent, respectively. The cyclohexene-treated samples were extracted with water following a standard solvent extraction method.

The non-water-leachable (NWL) bromine species of cyclohexene-treated B-PAC3 increased significantly. The results of these experiments can be seen in Table 1 and are represented in the bar chart in FIG. 3. As shown in FIG. 4, the mercury sequestration performance of cyclohexene-treated B-PAC3 was comparable to that of the commercially available B-PAC3 (FIG. 4). Thus the treatment with the cyclohexene olefinic treating agent had no significant adverse effect on the performance of the cyclohexene-treated B-PAC3. After water extraction, the mercury adsorption efficiency of these samples was slightly lower. It should be noted that the kinetics of mercury adsorption by the cyclohexene-treated samples was somewhat slower. It was concluded that the treatments pursuant to this invention are useful and desirable for gas scrubbing operations involving CDS or SDA, and for systems employing fully wet $SO_2$ scrubbers. On the other hand, such treatments may find more limited use in scrubbing operations involving short reaction time conditions such as in-flight and one-pass systems.

TABLE 1

| | | | | Relative to total bromine content | |
|---|---|---|---|---|---|
| | Sorbent components | Sorbent bromine content | Sorbent hydrocarbon content | Water-leachable bromine | Non-water-leachable bromine |
| Example | | | | | |
| 1 | PAC3 + cyclohexene + $Br_2$ | 5.32 wt % | 6 wt % | 6 wt % | 94 wt % |
| 2 | PAC3 + cyclohexene + $Br_2$ | 5.85 wt % | 3 wt % | 17 wt % | 83 wt % |
| 3 | B-PAC3 + cyclohexene | 6.62 wt % | 6 wt % | 25 wt % | 75 wt % |
| 4 | B-PAC3 + cyclohexene | 6.86 wt % | 3 wt % | 28 wt % | 72 wt % |
| Comparative | | | | | |
| 1 | B-PAC3 | 7.30 wt % | 0 | 73 wt % | 27 wt % |
| 2 | NaBr-PAC5 | 3.95 wt % | 0 | 98 wt % | 2 wt % |

Applications of NWL Brominated Carbonaceous Sorbents

In semi-dry $SO_2$ scrubbers (CDS) or high-moisture scrubbers (SDA), these brominated sorbents of the invention are injected into a gaseous stream upstream of the scrubber device, and at least a portion of the brominated sorbent will circulate in the system numerous times. When injected into a gaseous stream, the brominated sorbents are typically injected at a rate of about 0.5 to about 15 lb/MMacf ($8 \times 10^{-6}$ to $240 \times 10^{-6}$ $kg/m^3$). Preferred injection rates are about 1 to about 10 lb/MMacf ($16 \times 10^{-6}$ to $160 \times 10^{-6}$ $kg/m^3$); more preferred are injection rates of about 2 to about 5 lb/MMacf ($32 \times 10^{-6}$ to $80 \times 10^{-6}$ $kg/m^3$), though it is understood that the preferred injection rate varies with the kinetics of reaction for mercury species with the sorbent, the mercury capacity of the sorbent, the relevant mercury emission limit, and the particular system configuration.

The brominated sorbents will be in cyclical short-term (as in CDS case) and long-term (as in SDA case) contact with water. Since their bromine content is not leachable, these sorbents maintain their high mercury capture capabilities throughout their application (bromine is the active species for mercury removal or capture). In fully-wet $SO_2$ scrubbers, the brominated sorbents are either injected into the gaseous stream upstream of the wet scrubber or directly into the liquid of the scrubber. Together with the liquid, the brominated sorbents recirculate many times in the scrubber and will maintain their mercury capture capabilities. In sharp contrast, the results of Comparative Example 2 shown in Table 1 and displayed in FIG. 3 indicate that bromide salt PACs lose nearly all of their bromine in one pass through the system and will not be as effective as the non-water-leachable (NWL) brominated carbonaceous sorbents produced pursuant to this invention wherein an olefinic treating agent is used before, during, and/or after bromination.

As used throughout this document, the phrase "gaseous stream" refers to a quantity of gas that is moving in a direction. Examples of gaseous streams include combustion gas and flue gas, both of which often contain mercury species and/or other contaminants.

The non-water-leachable brominated sorbents of this invention may be useful to remove contaminants other than or in addition to mercury, such as other heavy metals.

It should be noted that in use under actual service temperature conditions, the NWL brominated carbonaceous sorbents of this invention will typically be exposed to temperatures of less than 300° F. (ca. 149° C.). The NWL brominated carbonaceous sorbents are deemed thermally stable under these temperature conditions.

The sorbent particles are carried by the gas stream to a particulate collection device, where the sorbent particles are collected. Typical particulate collection devices include electrostatic precipitators (ESP) and fabric filters (baghouse filters). For use in semi-dry, high moisture, and wet applications, fabric filters are a preferred collection device.

As used in connection with the methods and/or compositions of this invention, where such use occurs anywhere herein including the claims, the terms "adsorbent for mercury", "sorbent for mercury", "mercury adsorbent", and "mercury sorbent" mean the same thing. These are simply different modes of expression for the same thing.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure.

The invention may comprise, consist, or consist essentially of the materials and/or procedures recited herein.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to only the particular exemplifications presented hereinabove.

The invention claimed is:

1. A method for increasing the resistance of a brominated carbonaceous sorbent to water leaching of bromine species, which method comprises contacting a carbonaceous substrate with at least one organic compound that contains at least one olefinic double bond in an amount sufficient to increase the resistance of the brominated sorbent to water leaching of bromine species, wherein bromination of the carbonaceous substrate is conducted prior to, during, and/or after said treatment with the organic compound.

2. A method as in claim 1 wherein said bromination is conducted with gaseous elemental bromine.

3. A method as in claim 2 wherein the bromination is conducted only prior to treatment with said organic compound; only during treatment with said organic compound; or only after treatment with said organic compound.

4. A method as in claim 3 wherein said organic compound is in liquid form.

5. A method as in claim 1, wherein the bromination is with a bromine-containing compound in gas or liquid form in a sufficient amount to increase the ability of the carbonaceous substrate to adsorb mercury and/or mercury-containing compounds and/or species.

6. A method as in claim 5 wherein said contacting of said carbonaceous substrate with organic compound is conducted only prior to bromination of said carbonaceous substrate; only during bromination of said carbonaceous substrate; or only after bromination of said carbonaceous substrate.

7. A method as in claim 1 wherein said carbonaceous substrate is powdered activated carbon.

8. A method as in claim 1 wherein said organic compound that contains at least one olefinic double bond:
 1) is an organic aliphatic or cycloaliphatic compound that contains an aliphatic or cycloaliphatic moiety containing a single olefinic double bond, which moiety is represented by the formula

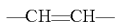

or a mixture of two or more such compounds; or
 2) is an organic aliphatic or cycloaliphatic compound that contains an aliphatic or cycloaliphatic moiety containing a single olefinic double bond represented by the formula $-CR^1{=}CR^2-$ where $R^1$ is a $C_{1-3}$ alkyl group and $R^2$ is independently a $C_{1-3}$ alkyl group or a hydrogen atom; or a mixture of two or more such compounds; or
 3) is a non-cyclic aliphatic organic compound that contains a conjugated or non-conjugated pair of double bonds and that is represented by the formula $R^1CH_2{=}CH{-}(R^3)_n{-}CH{=}CHR^2$ where $R^1$ is a hydrogen atom or an alkyl group having in the range of 1 to about 4 carbon atoms, $R^2$ is independently a hydrogen atom or an alkyl group having in the range of 2 to about 4 carbon atoms, and $R^3$ is an alkylene group containing in the range of 1 to about 4 carbon atoms, and n is either 0 or 1; or a mixture of two or more such compounds; or
 4) is a cycloaliphatic organic compound that contains a conjugated pair of double bonds in an otherwise saturated aliphatic 5-membered ring or a conjugated or non-conjugated pair of double bonds in an otherwise saturated aliphatic 6 to 10-membered ring system, or a mixture of two or more such compounds; or
 5) is an organic compound that contains one or two vinyl substituents directly bonded to an aromatic ring system, or a mixture of two or more such compounds.

9. A method of claim 8 wherein said aromatic ring system of said organic compound of 5) that contains one or two vinyl substituents directly bonded to an aromatic ring system is a substituted or unsubstituted benzene ring.

10. A method as in claim 8 wherein said organic compound that contains at least one olefinic double bond is an organic aliphatic or cycloaliphatic compound that contains an aliphatic or cycloaliphatic moiety containing a single olefinic double bond, which moiety is represented by the formula

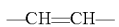

or a mixture of two or more such compounds.

11. A method as in claim 10 wherein said organic compound that contains at least one olefinic double bond is cyclohexene.

12. A method as in claim 1 wherein said organic compound that contains at least one olefinic double bond is in an amount in the range of about 0.5 wt % to about 20 wt % relative to the total weight of the brominated carbonaceous sorbent, and/or wherein the sorbent has a content in the range of about 0.1 to about 20 wt. % bromine, based on the weight of the brominated carbonaceous sorbent after contact with the bromine-containing compound.

13. A method for producing a brominated sorbent having increased resistance to water leaching of bromine species, which method comprises contacting a brominated carbonaceous sorbent with at least one organic compound that contains at least one olefinic double bond.

14. A method for removing mercury and/or mercury-containing compounds and/or species from a gaseous stream, and/or for removing one or more other heavy metals or other contaminants from a gaseous stream and/or a scrubber, the method comprising the steps of:
  injecting a sorbent as in claim 1 into a gaseous stream containing mercury and/or one or more other heavy metals or other contaminants, whereby an amount of said sorbent is widely dispersed in at least a portion of said gaseous stream in an amount sufficient to adsorb mercury and/or mercury-containing compounds and/or species, and/or one or more other heavy metals or other contaminants, from the gaseous stream; and collecting and removing the sorbent from the so treated gaseous stream; or
  injecting a sorbent as in claim 1 into a gaseous stream upstream of the scrubber device, where the scrubber device is a semi-dry scrubber or a high moisture scrubber; or
  injecting a sorbent as in claim 1 into the gaseous stream upstream of a wet scrubber or directly into a liquid of a wet scrubber,
  wherein the sorbent has been formed by contacting a carbonaceous substrate with at least one organic compound that contains at least one olefinic double bond in an amount sufficient to increase the resistance of the brominated sorbent to water leaching of bromine species, wherein bromination of the carbonaceous substrate is conducted prior to, during, and/or after said treatment with the organic compound.

15. A brominated carbonaceous sorbent composition having increased resistance to water leaching when exposed to water, water solutions, and/or water suspensions during handling or use, wherein said sorbent has been formed by contact with at least one organic compound that contains at least one olefinic double bond in an amount sufficient to provide increased resistance to water leaching prior to, during, and/or after bromination.

16. A composition as in claim 15 wherein said bromination is conducted with a bromine-containing compound in gaseous form.

17. A composition as in claim 15 wherein said bromination is conducted with gaseous elemental bromine.

18. A composition as in claim 15 wherein said organic compound that contains at least one olefinic double bond:
  1) is an organic aliphatic or cycloaliphatic compound that contains an aliphatic or cycloaliphatic moiety containing a single olefinic double bond, which moiety is represented by the formula
    —CH=CH—
  or a mixture of two or more such compounds; or
  2) is an organic aliphatic or cycloaliphatic compound that contains an aliphatic or cycloaliphatic moiety containing a single olefinic double bond represented by the formula
    —CR$^1$=CR$^2$—
  where R$^1$ is a C$_{1-3}$ alkyl group and R$^2$ is independently a C$_{1-3}$ alkyl group or a hydrogen atom; or a mixture of two or more such compounds; or
  3) is a non-cyclic aliphatic organic compound that contains a conjugated or non-conjugated pair of double bonds and that is represented by the formula
    R$^1$CH$_2$=CH—(R$^3$)$_n$—CH=CHR$^2$
  where R$^1$ is a hydrogen atom or an alkyl group having in the range of 1 to about 4 carbon atoms, R$^2$ is independently a hydrogen atom or an alkyl group having in the range of 2 to about 4 carbon atoms, and R$^3$ is an alkylene group containing in the range of 1 to about 4 carbon atoms, and n is either 0 or 1; or a mixture of two or more such compounds; or
  4) is a cycloaliphatic organic compound that contains a conjugated pair of double bonds in an otherwise saturated aliphatic 5-membered ring or a conjugated or non-conjugated pair of double bonds in an otherwise saturated aliphatic 6 to 10-membered ring system, or a mixture of two or more such compounds; or
  5) is an organic compound that contains one or two vinyl substituents directly bonded to an aromatic ring system, or a mixture of two or more such compounds.

19. A composition of claim 18 wherein said aromatic ring system of said organic compound of 5) is a substituted or unsubstituted benzene ring.

20. A composition as in claim 18 wherein said organic compound that contains at least one olefinic double bond is an organic aliphatic or cycloaliphatic compound that contains an aliphatic or cycloaliphatic moiety containing a single olefinic double bond, which moiety is represented by the formula
  —CH=CH—
or a mixture of two or more such compounds.

21. A composition as in claim 20 wherein said organic compound that contains at least one olefinic double bond is cyclohexene.

22. A composition as in claim 15 wherein said organic compound that contains at least one olefinic double bond is in an amount in the range of about 0.5 wt % to about 20 wt % relative to the total weight of the brominated carbonaceous sorbent, and/or wherein the sorbent has a content in the range of about 0.1 to about 20 wt. % bromine, based on the weight of the brominated carbonaceous sorbent after contact with the bromine-containing compound.

\* \* \* \* \*